(12) United States Patent
Alam et al.

(10) Patent No.: US 8,306,864 B2
(45) Date of Patent: *Nov. 6, 2012

(54) CONTROL SYSTEM INTERFACE FOR FLEXIBLE ORDER TRANSACTION SYSTEM

(75) Inventors: Muhammad M. Alam, Santa Clara, CA (US); Ruediger Meyfarth, Heidelberg (DE); Sam S. Hwang, Los Altos, CA (US)

(73) Assignee: SAP AG, Walldorf (DE)

( * ) Notice: Subject to any disclaimer, the term of this patent is extended or adjusted under 35 U.S.C. 154(b) by 716 days.

This patent is subject to a terminal disclaimer.

(21) Appl. No.: 12/493,454

(22) Filed: Jun. 29, 2009

(65) Prior Publication Data

US 2010/0005005 A1 Jan. 7, 2010

Related U.S. Application Data

(62) Division of application No. 10/850,814, filed on May 21, 2004, now Pat. No. 7,571,118.

(51) Int. Cl.
*G06Q 30/00* (2012.01)

(52) U.S. Cl. ............ 705/26.1; 705/6; 705/7; 705/8; 705/9; 705/10; 705/28; 705/29; 705/400; 705/500; 707/99; 707/100; 707/105

(58) Field of Classification Search ................ 705/26.1, 705/6, 7, 8, 9, 10, 28, 29, 400, 500; 707/99, 707/100, 105
See application file for complete search history.

(56) References Cited

U.S. PATENT DOCUMENTS

| | | | | |
|---|---|---|---|---|
| 5,818,716 A | * | 10/1998 | Chin et al. | 700/100 |
| 6,023,683 A | | 2/2000 | Johnson et al. | |
| 7,218,980 B1 | * | 5/2007 | Orshansky et al. | 700/99 |
| 2001/0027447 A1 | * | 10/2001 | Matsuura | 705/400 |
| 2002/0069103 A1 | * | 6/2002 | Puri et al. | 705/11 |
| 2002/0077979 A1 | | 6/2002 | Nagata | |
| 2002/0099585 A1 | * | 7/2002 | Locke | 705/7 |
| 2002/0171872 A1 | * | 11/2002 | Matsunaga | 358/1.18 |
| 2003/0172007 A1 | * | 9/2003 | Helmolt et al. | 705/28 |
| 2003/0200150 A1 | * | 10/2003 | Westcott et al. | 705/26 |
| 2004/0143488 A1 | * | 7/2004 | Wang | 705/10 |
| 2005/0131779 A1 | | 6/2005 | Kitamura et al. | |
| 2010/0004978 A1 | * | 1/2010 | Pickard et al. | 705/10 |

FOREIGN PATENT DOCUMENTS

JP 2001154722 8/2001

* cited by examiner

*Primary Examiner* — Yogesh C Garg
(74) *Attorney, Agent, or Firm* — Kenyon & Kenyon LLP

(57) ABSTRACT

The present invention provides a control system interface for accessing a plurality of functions relating to a flexible order transaction system.

18 Claims, 7 Drawing Sheets

Planned Order Management

Order Overview  Edit  Goto  Settings  System  Help

☐ Order Overview  ☐ Detail Area  ☐ User-defined

Split
Merge
Change

| Processed | Order | Product | Product Description | Start Date | Start Time | Avail. Date | Avail. Time | Del'd Strt | Del. Avail | Rcpt |
|---|---|---|---|---|---|---|---|---|---|---|
| | 55718 | GF_MAT_MTTAM | Material GF_MAT_MTTAM | 03/25/2002 | 01:30:00 | 03/25/2002 | 12:00:00 | 0.00 | 3.50 | |
| | 55949 | SK35_CONV_CAR | Convertible Car | | 08:00:00 | 03/25/2002 | 08:03:00 | 0.00 | 0.00 | |
| | 55954 | | Convertible Car | | 08:05:44 | 03/25/2002 | 08:08:44 | 3.66 | 3.66 | |
| | 55955 | | Convertible Car | | | 03/25/2002 | 08:08:44 | 0.00 | 0.00 | |
| | 55939 | JK_QA5_AUTOV3 | | | 08:12:00 | 03/25/2002 | 08:36:00 | 3.66 | 3.64 | |
| | 55957 | JSK35_CONV_CAR | Convertible Car | | 08:22:20 | 03/25/2002 | 08:25:20 | 0.00 | 0.00 | |
| | 55703 | SK36_CAR | Convertible Car-MTS example | | 11:57:00 | 03/25/2002 | 12:00:00 | 0.00 | 3.50 | |
| | 55723 | SK34_PHONE | Phone - MTO - Line | 03/27/2002 | 17:58:00 | 03/27/2002 | 18:00:00 | 0.00 | 1.25 | |
| | 55731 | | Phone - MTO - Line | | | 03/27/2002 | 18:00:00 | 0.00 | 1.25 | |
| | 55735 | | Phone - MTO - Line | | | 03/27/2002 | 18:00:00 | 0.00 | 0.00 | |
| | 55736 | | Phone - MTO - Line | | | 03/27/2002 | 18:00:30 | 0.00 | 0.00 | |
| | 56006 | JK_QA5_AUTOV3 | | 04/02/2002 | 08:24:00 | 04/02/2002 | 08:48:00 | 0.00 | 0.00 | |

FIG. 2

CONTROL SYSTEM INTERFACE FOR FLEXIBLE ORDER TRANSACTION SYSTEM

RELATED APPLICATIONS

This application claims priority under 35 U.S.C. §121 to U.S. patent application Ser. No. 10/850,814, entitled Control System Interface for Flexible Order Transaction System, which is herein incorporated by reference in its entirety. This application also incorporates by reference the following patents in their entirety: U.S. Pat. No. 7,409,351, entitled Method And System For Splitting An Order In A Flexible Order Transaction System, U.S. Pat. No. 7,464,038, entitled Method And System For Changing An Order In A Flexible Order Transaction System, U.S. Pat. No. 7,464,039, entitled Method And System For Merging Orders In A Flexible Order Transaction System, and U.S. Pat. No. 7,363,238, entitled Method And System For Cost Integration In A Flexible Order Transaction System.

FIELD OF THE INVENTION

The present invention relates to information systems and computer interfaces. In particular, the present invention provides a method and system for a user interface allowing access to unique features of a flexible order system. In one embodiment of the present invention, the flexible order system relates to a shop floor manufacturing system controlling an already in progress production order.

BACKGROUND OF THE INVENTION

Modern enterprise business software systems may provide among other services functions for Supply Chain Monitoring, Supply Chain Collaboration, Demand Planning, Supplier Network Planning, Multilevel Supply and Demand Matching, Global ATP ("Available to Production"), Production Planning, Transportation Training and Vehicle Scheduling, Maintenance and Service Training, Master Data and Administration Functions. These services may be made available from a single software application, which is referred to herein as an APO ("Advanced Planning Optimizer"). Associated with an APO is a set of tables containing business data. These tables may be accessed by functions provided by the APO.

With respect to production planning, as production and manufacturing cycles become more complex, it becomes apparent that the software must provide services for tracking these complex transactions and allow for flexible transaction processing. Particularly for certain complex environments such as the semiconductor industry it is often necessary to accommodate highly complex order splits, merges and changes.

In addition to providing functions to handle complex split, merge and change requirements, it would be beneficial to provide access to these services in a convenient manner such as through a convenient user interface such as graphical user interface ("GUI"). This is particularly apparent, as it is often necessary to access these functionalities from an industrial environment.

SUMMARY OF THE INVENTION

The present invention provides a user interface for accessing and implementing a set of split, merge and change functionalities via a graphical user interface, through a supply-chain management system or through an application programming interface.

BRIEF DESCRIPTION OF THE DRAWINGS

FIG. 2 shows a user interface for accessing functions in a FOT according to one embodiment of the present invention.

DETAILED DESCRIPTION

Figure 1:
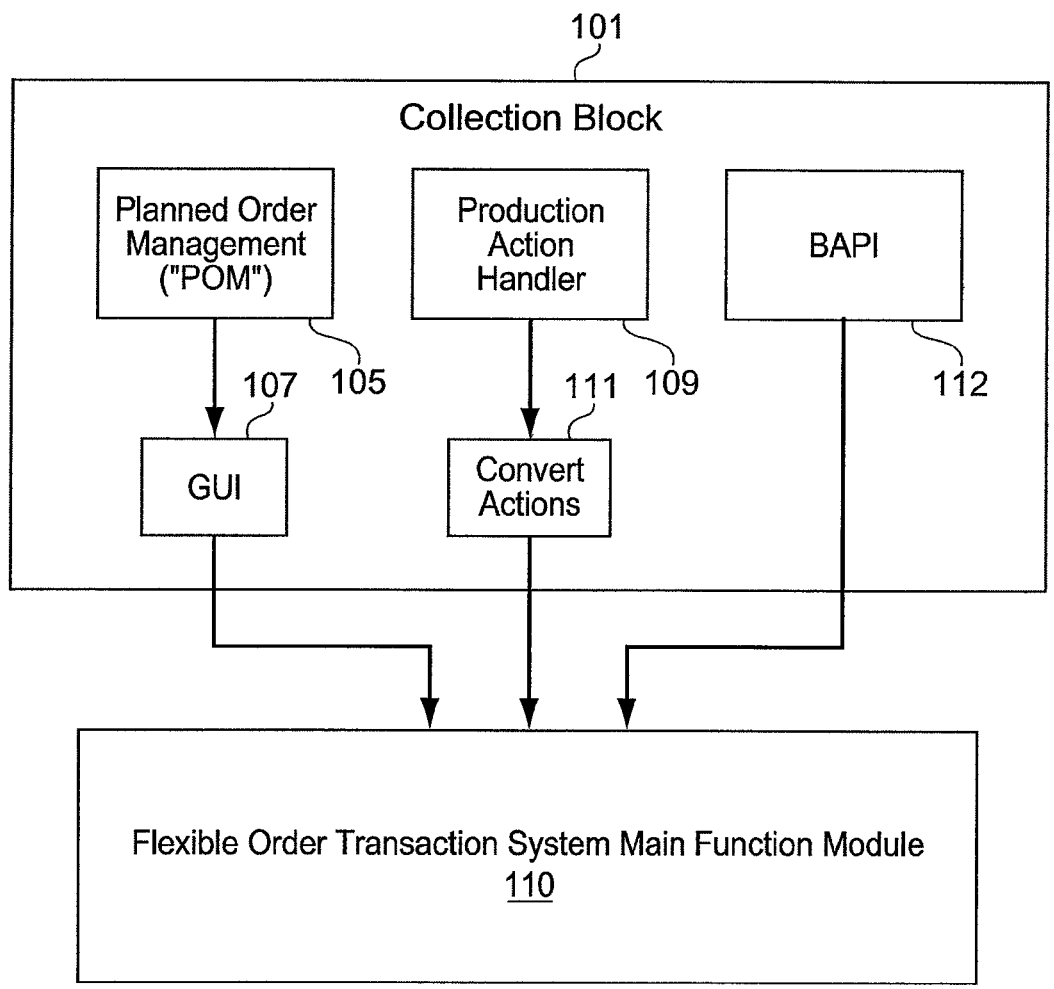
FIG. 1 is a block diagram of shows a block diagram of a system for providing a user interface to a flexible order transaction system ("FOT") according to one embodiment of the present invention.

FIG. 1 is a block diagram of a system for providing a user interface to a flexible order transaction system ("FOT") according to one embodiment of the present invention. As shown in FIG. 1, FOT 110 provides sophisticated functions for handling flexible order transactions. These functions may provide for advanced handling or order splits, order merges and order changes. The various systems shown in FIG. 1 may be part of a larger APO system as discussed above.

FIG. 1 shows collection block including POM ("Planned Order Management") 105, GUI 107, PAH ("Production Action Handler") 109, convert actions 111 and BAPI ("Business Application Programming Interface") 112.

POM provides services for showing the status of orders. In addition, POM provides functionality for accessing functions provided by FOT such as order splits, merges and changes. POM provides GUI 107 that allows for access of the services and functions in POM. In particular, as shown in FIG. 1, POM 105 may access functions in FOT 110 via GUI 107.

PAH 109 provides access to FOT function module 110 via convert actions 111. BAPI 112 provides API calls to access FOT functions 110.

FIG. 2 shows a user interface for accessing functions in a FOT according to one embodiment of the present invention. FIG. 2 shows POM window 205. POM window 205 provides graphical display of orders 210 and associated information such as product, product description, etc. In addition POM window includes FOT function selection button 215. Using POM window 205, a user may select particular orders for processing via FOT functions. Selection button 215 then allows a user to select particular FOT functions to be executed on orders chosen via POM window 205.

Figure 3:
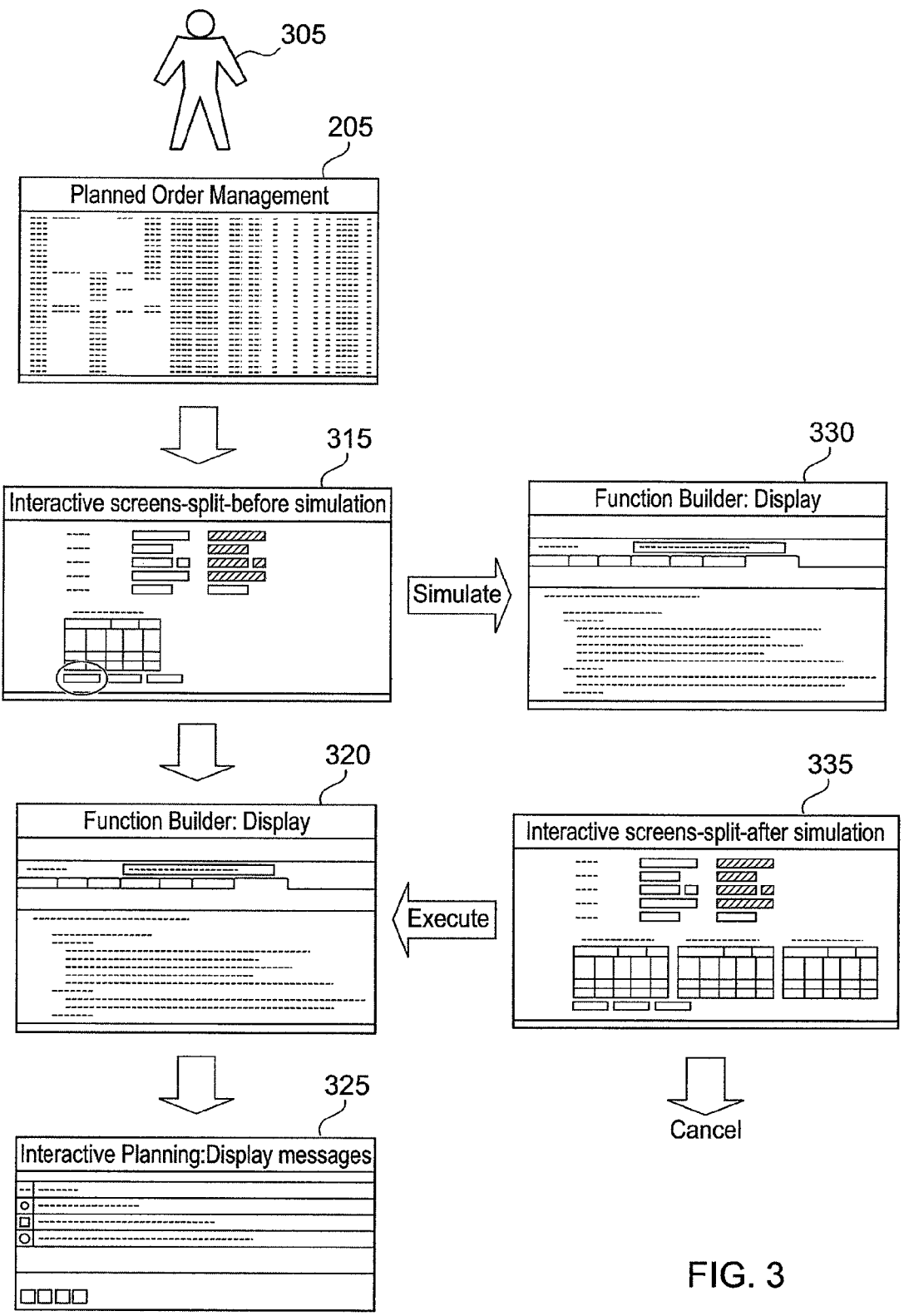
FIG. 3 shows an exemplary interaction with a control system interface in order to access FOT functions according to one embodiment of the present invention.

FIG. 3 shows an exemplary interaction with a control system interface in order to access FOT functions according to one embodiment of the present invention. User 305 selects orders for processing via POM window 205 (see FIG. 2).

Upon choosing selection button 215, user 305 may select particular FOT functions 110 to be executed. In particular, with respect to FIG. 3 and for illustrative purposes only, it is assumed that user 305 has selected a split function included in FOT 110. Upon this selection, interactive screen 315 is displayed to user 305.

Figure 4A:
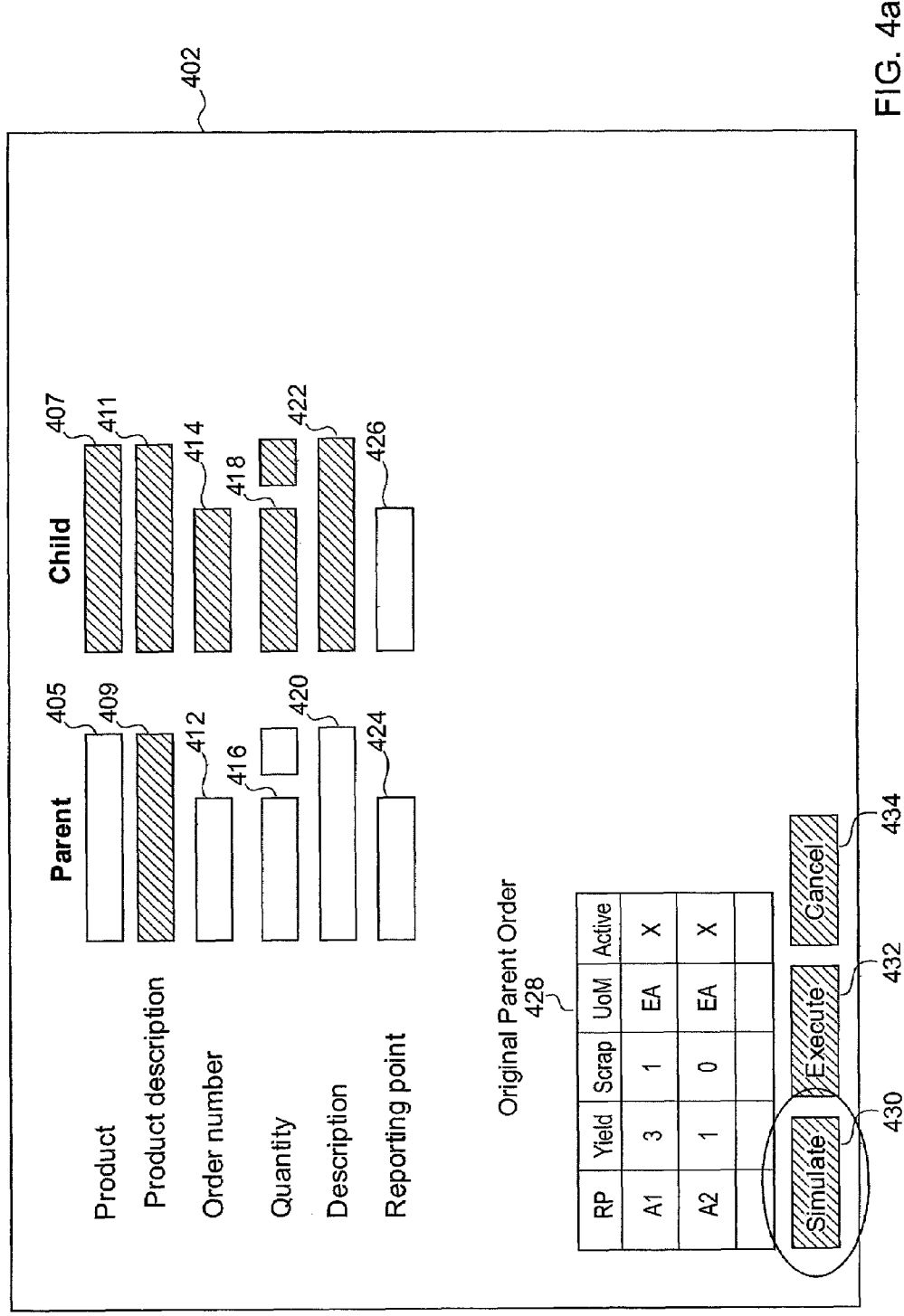
FIG. 4a shows a split interactive screen prior to execution of a simulate function according to one embodiment of the present invention.

FIG. 4a shows a split interactive screen prior to execution of a simulate function according to one embodiment of the present invention. Pre-simulate split screen 401 is shown upon selection of merge FOT function from POM window 205. Pre-simulate split screen 401 includes product field for parent and child orders (405 and 407 respectively), product description fields for parent and child orders (409 and 411 respectively), order number of parent and child orders (412 and 414) respectively, quantity fields for parent and child orders (416 and 418 respectively), description fields for parent and child orders (420 and 422 respectively) and reporting point fields for parent and child orders (424 and 426 respectively). Fields shown in grey are those updated by the control order interface system itself and are not user-changeable. Reporting points are times during a production process at which a production management system may receive reporting regarding the status of processing up to that point.

In order to effect a split for a particular order, the user enters a product in product field 405, order number in order number field 412, quantity in quantity field 416, description in description field 420, and reporting points of parent and child in respective fields 424 and 426. The control system fills in fields 407, 409, 411, 414, 418, and 422.

Also shown in FIG. 4*a* is original parent order window 428. Original parent order window shows table headings for reporting points, yield, scrap, UoM ("Unit of Measure") and Active.

FIG. 4*a* also shows simulate button 430, execute button 432 and cancel button 434. Selecting cancel button 434 cancels the split. Selecting execute 434 executes the split and calls the corresponding FOT function for order splitting using the data supplied in fields 405-426.

Selecting simulate button 430 allows the user to perform a simulation of the split action in order to experiment with quantities, etc. A subsequent screen (see FIG. 4*b*) will show the outcome of the split, upon which the user may then decide to actually execute the split, perform another simulation or cancel the split.

Figure 4B:
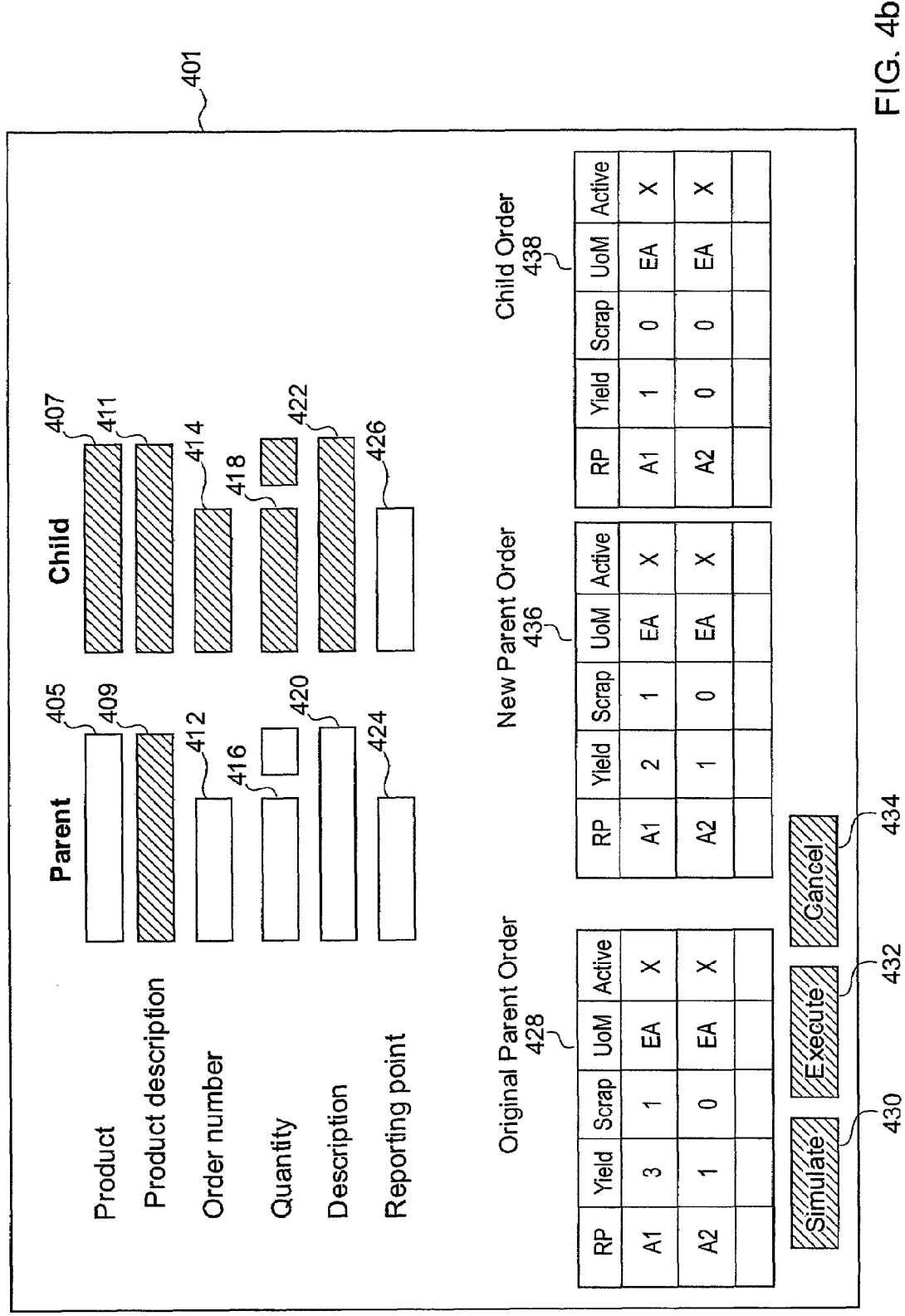
FIG. 4b shows a split interactive screen subsequent to execution of a simulate function according to one embodiment of the present invention.

FIG. 4*b* shows a split interactive screen subsequent to execution of a simulate function according to one embodiment of the present invention. Note that upon selection of simulate, the user is presented with windows new parent order 436 and child parent order 438. These windows respectively reflect the outcome of a selected split based on the data entered with respect to FIG. 4*a*. However, as this information is only simulated, new parent order 436 and child order 438 screens provide a user with the opportunity to evaluate the possible outcome of performing such a split.

At this point the user may enter new split data to perform another simulation (by choosing simulate button 430), execute the split (by choosing execute button 432) or cancel (by choosing cancel button 434).

Figure 5:
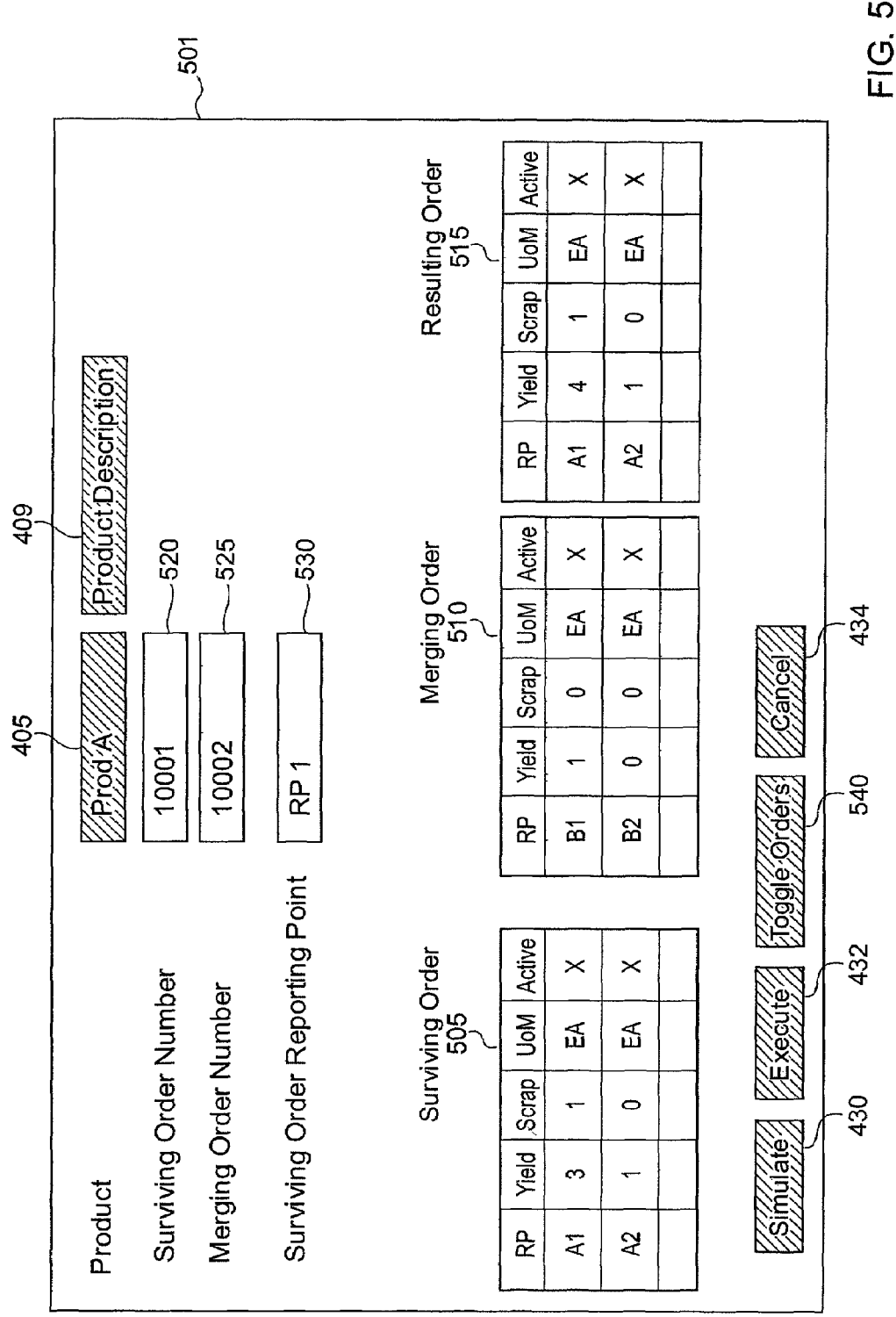
FIG. 5 shows a merge interactive screen according to one embodiment of the present invention.

FIG. 5 shows a merge interactive screen according to one embodiment of the present invention. Merge interactive screen 501 is displayed upon selection of merge FOT function via POM window 205. Merge interactive screen 501 includes product fields 405 and 409, surviving order number field 520, merging order number field 525 and surviving order reporting point field 530.

The user may enter a surviving order number in surviving order number field 520 and a merge order number in merge order number field 525. In addition, the user selects a surviving order reporting point by entering the appropriate information in surviving order reporting point field 530. Note that corresponding product and product description are respectively displayed in product fields 405 and 409.

The user may then simulate the merge using simulate button 430. The simulate function operates identically to the operation described with respect to FIGS. 4*a*-4*b*. In addition, the user may execute the merge via button 432, cancel the order via cancel button 434 or toggle orders via toggle orders button 540.

Surviving order window 505, merging order window 510 and resulting order window 515 are respectively display upon selection of a merge operation.

Figure 6:
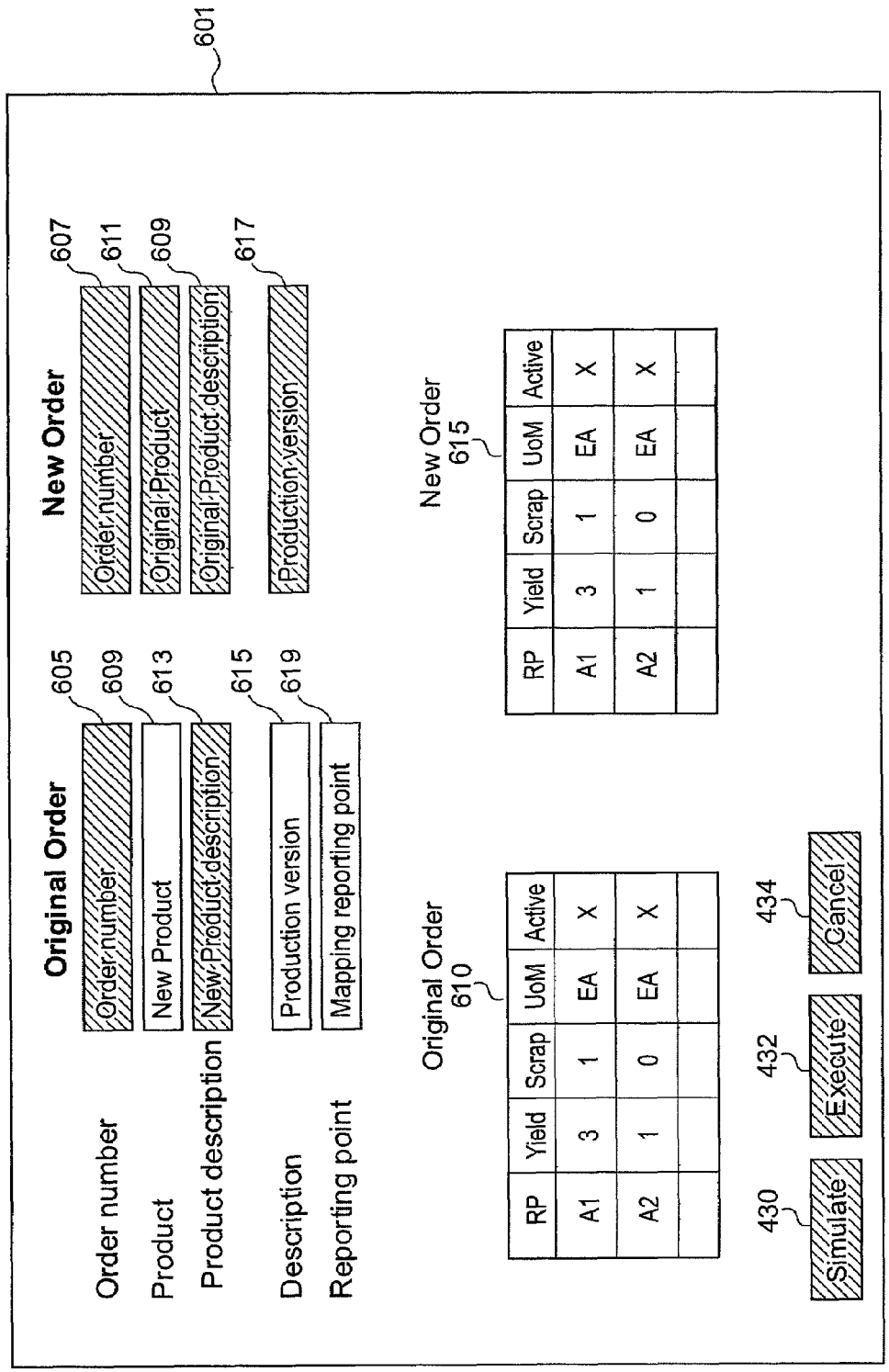
FIG. 6 shows a change order interactive screen according to one embodiment of the present invention.

FIG. 6 shows a change order interactive screen according to one embodiment of the present invention. Change order interaction screen 601 includes the order fields of order number 605, product 609, product description 613, description 615 and mapping reporting point 619. Change order interaction screen 601 also includes corresponding fields for the original order (607, 611, 609 and 617) referring to order number, original production, original product description and production version 617 respectively.

What is claimed is:

1. A computer-readable storage medium having program instructions, which when executed by a processor implement a control system interface for providing access to a flexible order transaction (FOT) system, the program comprising instructions for:
   selecting at least one order via an order selection control;
   selecting at least one FOT function to be performed on the at least one; order via a FOT function selection control; and
   providing at least one interactive screen corresponding to each of the at least one FOT function;
   wherein the control system interface provides access to a selected FOT function through a corresponding interactive screen, and
   the at least one FOT function includes at least one of a merge order function for merging orders and a change order function that receives a new product via the interactive screen corresponding to the change order function.

2. The computer-readable storage medium of claim 1, wherein the program further comprises instructions for receiving a surviving order number, a merging order number and a surviving order reporting point via the interactive screen.

3. The computer-readable storage medium of claim 1, wherein the program further comprises instructions for showing information corresponding to a reporting point, yield and scrap for a surviving order, a merging order and a resulting order via the interactive screen.

4. The computer-readable storage medium of claim 1 wherein the merge order function:
   receives a request to merge an order, the request specifying the surviving order;
   determines at least one of a yield quantity a scrap quantity and a work-in-progress quantity at each reporting point in a first production process for the order, the first production process including a plurality of reporting points;
   maps at least two pairs of reporting points between the first production process for the order and a second production process for the child order, the second production process including a plurality of reporting points;
   merges, at each mapped pair of reporting points, the yield quantity, the scrap quantity, and the work-in-progress quantity from the order to the surviving order; and
   transfers, for each unmapped reporting point in the first production process for the order, the scrap quantity and the work-in-progress quantity as a function of the mapped reporting points.

5. The computer-readable storage medium of claim 1, wherein the program further comprises instructions for showing information corresponding to a reporting point, yield and scrap for a new order and an original order via the interactive screen.

6. The computer-readable storage medium of claim 1, wherein the change order function:
receives a request to change an order, the request specifying the new product;
determines at least one of a yield quantity a scrap quantity and a work-in-progress quantity at each reporting point in a first production process for the product, the first production process including a plurality of reporting points;
maps at least two pairs of reporting points between the first production process for the order and a second production process for the child order, the second production process including a plurality of reporting points;
moves, at each mapped pair of reporting points, the yield quantity, the scrap quantity, and the work-in-progress quantity from the order to the new order; and
transfers, for each unmapped reporting point in the first production process for the order, the scrap quantity and the work-in-progress quantity as a function of the mapped reporting points.

7. A system for performing transactions comprising:
a control system interface; and
a processor configured to execute program instructions to provide a plurality of flexible order transaction (FOT) functions via the control system interface, the control system interface including:
an order selection control for selecting at least one order;
a FOT function selection control for selecting at least one FOT function to be performed on the at least one order; and
at least one interactive screen corresponding to each of the at least one FOT function;
wherein the control system interface provides access to a selected FOT function through a corresponding interactive screen, and
wherein the FOT selection control is configured to select at least one of a merge order function for merging orders and a change order function that receives a new product via the interactive screen corresponding to the change order function.

8. The system according to claim 7, wherein the merge order function:
receives a request to merge an order, the request specifying the surviving order;
determines at least one of a yield quantity a scrap quantity and a work-in-progress quantity at each reporting point in a first production process for the order, the first production process including a plurality of reporting points;
maps at least two pairs of reporting points between the first production process for the order and a second production process for the child order, the second production process including a plurality of reporting points;
merges, at each mapped pair of reporting points, the yield quantity, the scrap quantity, and the work-in-progress quantity from the order to the surviving order; and
transfers, for each unmapped reporting point in the first production process for the order, the scrap quantity and the work-in-progress quantity as a function of the mapped reporting points.

9. The system according to claim 7 wherein the change order function:
receives a request to change an order, the request specifying a new product;
determines at least one of a yield quantity a scrap quantity and a work-in-progress quantity at each reporting point in a first production process for the product, the first production process including a plurality of reporting points;
maps at least two pairs of reporting points between the first production process for the order and a second production process for the child order, the second production process including a plurality of reporting points;
moves, at each mapped pair of reporting points, the yield quantity, the scrap quantity, and the work-in-progress quantity from the order to the new order; and
transfers, for each unmapped reporting point in the first production process for the order, the scrap quantity and the work-in-progress quantity as a function of the mapped reporting points.

10. A method for providing access to a flexible order transaction (FOT) system comprising providing:
an order selection control for selecting at least one order;
a FOT function selection control for selecting at least one FOT function to be performed on the at least one order;
at least one interactive screen corresponding to each of the at least one FOT function;
wherein the control system interface provides access to a selected FOT function through a corresponding interactive screen, and
the at least one FOT function includes at least one of a merge order function for merging orders and a change order function that receives a new product via the interactive screen corresponding to the change order function.

11. The method according to claim 10, wherein the merge order function:
receives a request to merge an order, the request specifying the surviving order;
determines at least one of a yield quantity a scrap quantity and a work-in-progress quantity at each reporting point in a first production process for the order, the first production process including a plurality of reporting points;
maps at least two pairs of reporting points between the first production process for the order and a second production process for the child order, the second production process including a plurality of reporting points;
merges, at each mapped pair of reporting points, the yield quantity, the scrap quantity, and the work-in-progress quantity from the order to the surviving order; and
transfers, for each unmapped reporting point in the first production process for the order, the scrap quantity and the work-in-progress quantity as a function of the mapped reporting points.

12. The method according to claim 10, wherein the change order function:
receives a request to change an order, the request specifying a new product;
determines at least one of a yield quantity a scrap quantity and a work-in-progress quantity at each reporting point in a first production process for the product, the first production process including a plurality of reporting points;
maps at least two pairs of reporting points between the first production process for the order and a second production process for the child order, the second production process including a plurality of reporting points;
moves, at each mapped pair of reporting points, the yield quantity, the scrap quantity, and the work-in-progress quantity from the order to the new order; and transfers, for each unmapped reporting point in the first production process for the order, the scrap quantity and the work-in-progress quantity as a function of the mapped reporting points.

13. A computer-readable storage medium having program instructions, which when executed by a processor implement a control system interface for providing access to a flexible order transaction (FOT) system, the program comprising instructions for:
selecting at least one order via an order selection control;
selecting at least one FOT function to be performed on the at least one order via a FOT function selection control; and
providing at least one interactive screen corresponding to each of the at least one FOT function, the interactive screen corresponding to each at least one FOT function providing a simulation selection control for selecting a simulate function for simulating the at least one FOT function, wherein selection of the simulation selection control triggers performing a simulation of the at least one FOT function and display of a simulation result of the simulation.

14. The computer-readable storage medium of claim 13, wherein the FOT selection control is configured to select a merge order function, the simulation selection control of interactive screen corresponding to the merge order function is configured to provide selection of a simulate function for simulating an order merge, and selection of the simulation selection control triggers performing a simulation of the order merge and display of a simulation result of the simulation.

15. The computer-readable storage medium of claim 13, wherein the FOT selection control is configured to select a change order function, the simulation selection control of interactive screen corresponding to the change order function is configured to provide selection of a simulate function for simulating an order change, and selection of the simulation selection control triggers performing a simulation of the order change and display of a simulation result of the simulation.

16. A computer-implemented method, comprising:
displaying an order selection control, of a control system interface of a flexible order transaction (FOT) system, for selecting at least one order;
displaying a FOT function selection control, of the control system interface, for selecting at least one FOT function to be performed on the at least one order;
responsive to a selecting of the at least one FOT function using the FOT function selecting control, displaying an interactive screen corresponding to the selected FOT function, the interactive screen including a simulation selection control for selecting a simulation of the selected FOT function;
responsive to a selecting of the simulation selection control, performing a simulation of the selected FOT function; and
displaying a simulation result of the simulation of the selected FOT function.

17. The computer-implemented method of claim 16, wherein the at least one FOT function includes a merge order function, the displaying the interactive screen includes displaying an interactive screen corresponding to the merge order function, the simulation selection control of the interactive screen corresponding to the merge order function is configured to select a simulation of an order merge, the performing includes performing a simulation of the order merge, and the displaying the simulation result includes displaying a simulation result of the simulation of the order merge.

18. The computer-implemented method of claim 16, wherein the at least one FOT function includes a change order function, the displaying the interactive screen includes displaying an interactive screen corresponding to the change order function, the simulation selection control of the interactive screen corresponding to the change order function is configured to select a simulation of an order change, the performing includes performing a simulation of the order change, and the displaying the simulation result includes displaying a simulation result of the simulation of the order change.

* * * * *